United States Patent [19]

Mitchell et al.

[11] 3,901,407
[45] Aug. 26, 1975

[54] LOCKING CAP ASSEMBLY FOR A FILLER NECK
[75] Inventors: Ronald P. Mitchell, Rochester; Fred C. May, Grosse Ile, both of Mich.
[73] Assignee: Mercury Manufacturing Company, Wyandotte, Mich.
[22] Filed: July 10, 1974
[21] Appl. No.: 487,149

[52] U.S. Cl. ............... 220/315; 220/210; 220/323; 220/326; 70/169; 220/378
[51] Int. Cl. ............................................ B65d 45/00
[58] Field of Search ........... 220/315, 210, 326, 323, 220/378; 70/169–173

[56] References Cited
UNITED STATES PATENTS
3,289,442  12/1966  Berger et al. .................. 220/210 X
3,813,904  6/1974  Wallskog ....................... 220/326 X Primary Examiner—George T. Hall
Attorney, Agent, or Firm—Barnes, Kisselle, Raisch & Choate

[57] ABSTRACT

A filler neck cap assembly having an adapter mountable on a predetermined range of sizes of open ends of filler necks. A cap is releasably received on the adapter to prevent fuel from escaping through the open end of a filler neck on which the adapter is mounted and a lock carried by the cap prevents unauthorized removal of the cap from the adapter.

17 Claims, 4 Drawing Figures

LOCKING CAP ASSEMBLY FOR A FILLER NECK

This invention relates to caps for filler necks for fuel tanks and the like and more particularly to a locking cap assembly for a filler neck.

Objects of this invention are to provide a locking cap assembly which may be utilized to seal a predetermined range of sizes of open ends of filler necks, may be readily installed without any tools on a filler neck by unskilled persons, once installed is nearly impossible for unauthorized persons to remove, is of economical manufacture and assembly, has a long in-service life and is maintenance free.

These and other objects, features and advantages of this invention will be apparant from the following description, appended claims, and accompanying drawings in which:

Figure 1:
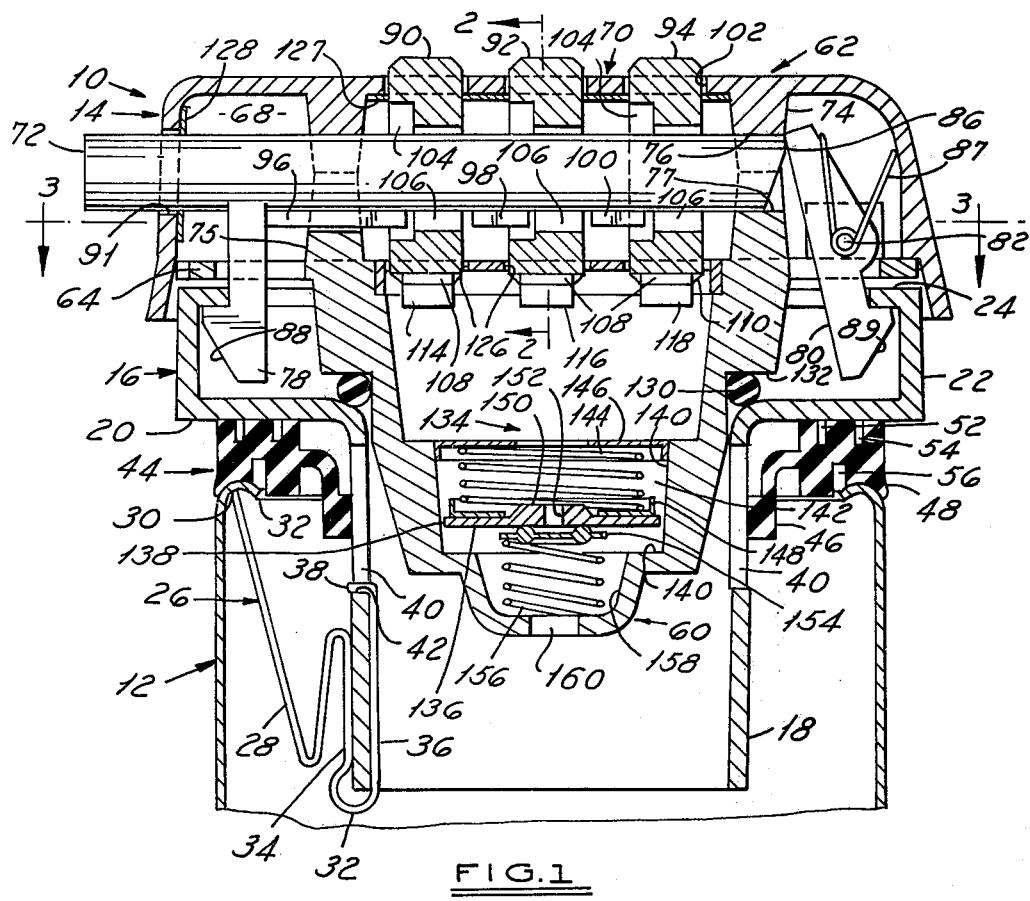
FIG. 1 is a full sectional view of a locking cap assembly embodying this invention installed on a filler neck of a fuel tank of a motor vehicle.
Figure 2:
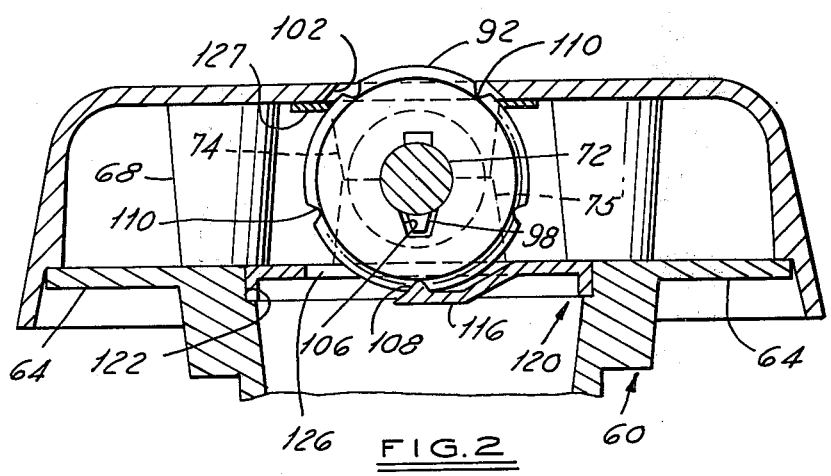
FIG. 2 is a fragmentary sectional view on line 2—2 of FIG. 1 illustrating the cap of the assembly of FIG. 1.

Referring in more detail to the drawings, FIG. 1 illustrates a locking cap assembly 10 embodying this invention installed on the open end of a filler neck 12 of a liquid reservoir (not shown), such as a gasoline tank of an automobile. Cap assembly 10 has a cap 14 releasably received and locked on an adapter 16 received in the open end of filler neck 12. Adapter 16 has a one-piece body with a tubular portion 18 received within filler neck 12, a generally redially extending flange portion 20 overlying the end of filler neck 12, and a cylindrical wall portion 22 which terminates in a radially inwardly projecting rib 24.

Adapter 16 is releasably retained in filler neck 12 by a plurality of circumferentially spaced spring steel clips 26, only one of which is shown in FIG. 1. Each spring steel clip 26 has a finger 28 with a free end 30 which underlies and bears on an inwardly extending flange or flared portion 32 of filler neck 12. Each clip 26 is secured to the lower end of adapter 16 by a generally U-shaped portion 32 of the clip with legs 34 and 36 bearing on the exterior and interior respectively of the side wall of tubular portion 18 of the adapter. Each leg 36 of clip 26 terminates in a radial tang 38 which extends through an opening 40 in tubular portion 18 of the adapter and bears on an edge 42 formed by opening 40. Each opening 40 provides access to the finger 28 of its associated clip 26 from the interior of adapter 16 to facilitate releasing the adapter from filler neck 12.

To prevent gases from escaping between filler neck 12 and adapter 16, a circumferentially continuous seal 44 of a resilient oil resistant material, such as BUNA-N, is interposed therebetween. Seal 44 is retained on adapter 16 by an inner annular portion 46 thereof which frictionally engages the wall of tubular portion 18. Seal 44 has an outer ring 48 with sufficient radial width to enable the lower face thereof to sealingly engage the open end of filler necks with a predetermined range of sizes or diameters. To assure that outer ring 48 of seal 44 may be axially compressed sufficiently to enable spring clips 26 to underlie flange 32 of filler neck 12 when adapter 16 is inserted therein, ring 48 has three circumferentially continuous grooves 52, 54, and 56 in the opposed sealing faces thereof.

Cap 14 has a body 60 receivable on adapter 16 and an overlying cover 62 secured to a flange 64 of the body by cap screws 66 received in studs 68 depending from the cover. Cap 14 is releasably latched and locked to adapter 16 by a lock mechanism 70 carried by the cap. Lock mechanism 70 has an actuator shaft 72 mounted for axial reciprocation within cap 14 by opposed studs 74 and 75 with complementary bearing surfaces 76 and 77 in the free ends thereof. Cap 14 is retained on adapter 16 by latches 78 and 80 adapted for underlying engagement with rib 24 of the adapter. Latch 78 is fixed to actuator shaft 72 for movement therewith and latch 80 is pivotally mounted on body 60 by a pin 82 received in a pair of studs 84 on flange 64 of the body. An end surface 86 of shaft 72 bears on latch 80 and both latches 78 and 80 are yieldably biased into engagement with adapter 16 by a wire spring 87 coiled around pivot pin 82 and bearing on the latch. When cap 14 is inserted into adapter 16, latches 78 and 80 are moved generally inwardly to slide over rib 24 on the adapter by inclined surfaces 88 and 89 on the latches which bear on the rib. Both latches 78 and 80 are disengaged from adapter 16 by manually pressing on the free end of actuator shaft 72 projecting exteriorly of cap 14 through a hole 91 therein to move the rod against the bias of spring 87.

Actuator shaft 72 may be locked in the latched position thereof shown in FIG. 1 by a combination lock having a plurality of dial wheels 90, 92 and 94 which cooperate with keys 96, 98 and 100 respectively fixed to actuator shaft 72. Rotation of actuator shaft 72 is also prevented by key 96 which is received in a keyway 101 in the stud 75 adjacent latch 78. Dial wheels 90, 92 and 94 are of identical construction and each projects through a slot 102 in cover 62 and is journalled on shaft 72 to rotate freely with respect thereto. So that each dial wheel may rotate freely on actuator shaft 72 when the shaft is in the latched position shown in FIG. 1, each wheel has a recess 104 therein providing clearance for its associated key 96, 98 and 100. To unlock actuator shaft 72 so it can be shifted to the right to disengage latches 78 and 80 from adapter 16, each dial wheel has a trapezoidal passageway 106 therethrough permitting its associated key to slide therethrough when the dial wheels are properly angularly oriented with respect to the keys on the actuator shaft.

Figure 3:
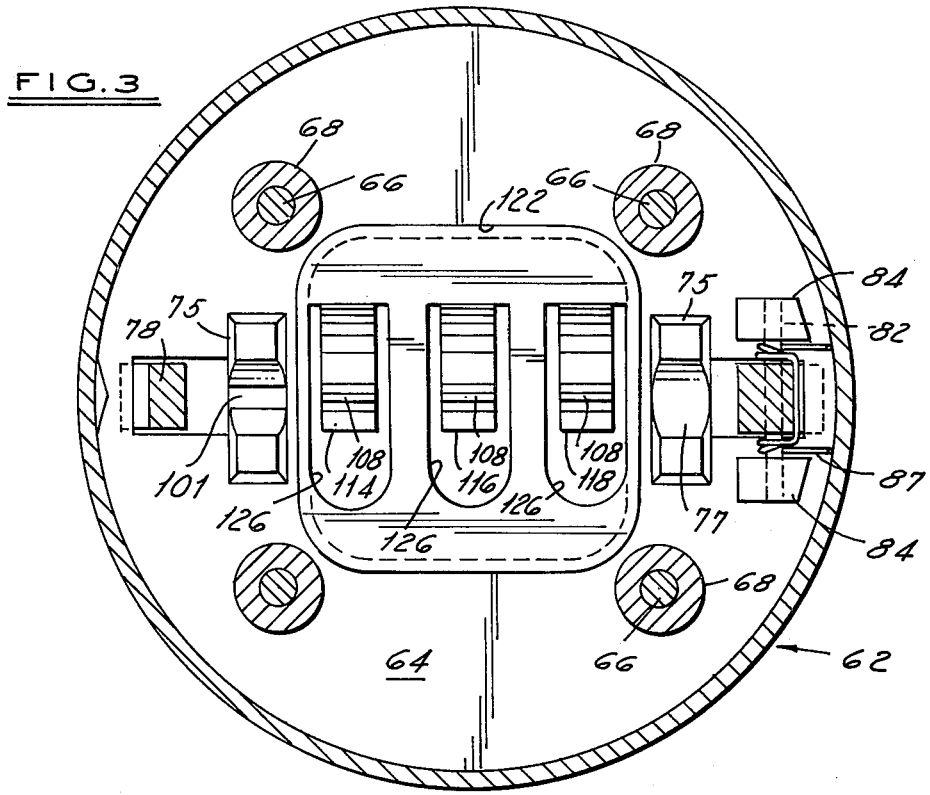
FIG. 3 is a sectional view on line 3—3 of FIG. 1.

Each dial wheel is yieldably restrained in a plurality of predetermined angular positions with respect to its associated key on actuator shaft 72 by a detent 108 (FIG. 3) engaging in circumferentially spaced notches 110 in the outer periphery of the dial wheel. Only one of the notches 110 in each dial wheel is located so that the passageway 106 thereof will be aligned with its associated key when engaged by detent 108. The detent 108 associated with each dial wheel is carried by an integral spring finger 114, 116 and 118 respectively of a detent plate 120 press fit in a recess 122 in the upper face of flange 64 of body 60. Each dial wheel has a plurality of circumferentially spaced numerals 124 embossed on the outer periphery thereof which may be observed one at a time through the slots 102 in cover 62 to provide a visual indication of the orientation of passageways 106 with their associated keys on shaft 72. Thus, by rotating dial wheels 90, 92 and 94 so that a predetermined combination of numerals 124 appear in slots 102, the passageway 106 of each wheel is aligned with its associated key 96, 98 and 100 on actuator shaft 72, thereby unlocking the actuator shaft.

To prevent dial wheels 90, 92 and 94 from being shifted axially in cap 14, they are received in slots 102 in cover 62 and slots 126 in detent member 120. Dust and dirt are prevented from entering the interior of cap 14 through slots 102 and hole 91 by seals 127 and 128 secured to cover 62 by a suitable adhesive. Liquid is prevented from escaping between adapter 16 and cap 14 by an O-ring 130 received on a shoulder 132 in body 60.

The filler neck 12 is vented to the atmosphere by a normally closed valve assembly 134 which opens whenever the pressure of the gases within the filler neck becomes either substantially subatmospheric or superatmospheric. Valve assembly 134 has a disc 136 with a peripheral edge 138 yieldably urged into sealing engagement with a mating side wall surface 140 of a pocket 142 in body 60 by a spring 144. The upper end of spring 144 is received in a retainer 146 which is press fit into engagement with interior side wall 140 and the lower end of the spring is received in a retainer 148, which is centered on disc 136 by a pilot 150 thereon. Disc 136 has a central hole 152 therethrough which is normally sealed by an underlying imperforate disc valve 154 yieldably urged into sealing engagement therewith by a spring 156 received in pocket 158 of body 60 with a hole 160 through the bottom thereof. In use, valve assembly 134 closes the interior of filler neck 12 to communication with the atmosphere exteriorly thereof so long as the pressure of the gases within filler neck 12 is substantially equal to the exterior atmospheric pressure. If the pressure of the gases within filler neck 12 becomes substantially subatmospheric, disc 154 will be displaced against the bias of spring 156 from disc 136, permitting air from the exterior atmosphere to enter filler neck 12 through hole 152 in disc 136 and hole 160 in body 60. This will allow the subatmospheric pressure within filler neck 12 to become substantially equal to the exterior atmospheric pressure, whereupon disc 154 will again seal hole 152 in disc 136, thereby terminating communication of filler neck 12 with the exterior atmosphere. If the pressure of the gases within filler neck 12 becomes substantially superatmospheric, disc 136 will be displaced upwardly against the bias of spring 144, thereby allowing gases within filler neck 12 to pass through hole 160, around the peripheral edge 138 of disc 136, and escape through body 60 to the exterior atmosphere. This will allow the superatmospheric pressure of the gases within filler neck 12 to become substantially equal to the exterior atmospheric pressure, whereupon disc 136 will be urged into sealing engagement with surface 140 of body 60 by spring 144, thereby closing filler neck 12 to communication with the exterior atmosphere. It has been found that a valve assembly 134 which opens whenever the pressure of the gases within filler neck 12 is one pound per square inch superatmospheric or one quarter pound per square inch subatmospheric is highly satisfactory.

In normal use of locking cap assembly 10, adapter 16 is permanently installed on filler neck 12 and the filler neck is closed and opened by insertion and removal of cap 14 on the adapter. Cap 14 may be locked on the adapter to prevent unauthorized persons from opening the filler neck, and when the cap is removed, a liquid, such as gasoline, may be poured into the filler neck through tubular portion 18 of the adapter 16.

Adapter 16 is mounted on filler neck 12 by inserting the tubular portion 18 of the adapter into the filler neck. As the adapter is inserted into filler neck 12, fingers 28 of spring clips 26 bear on flared portion 32 of the filler neck and are shifted generally radially inward until the free edges 30 of the fingers clear flared portion 32, whereupon the flexed fingers snap outwardly into underlying engagement with the flared portion, thereby securing the adapter to the filler neck. As adapter 16 is inserted into filler neck 12, outer ring 48 of seal 44 is axially compressed to provide a liquidtight seal between the adapter and the filler neck. When adapter 16 is permanently mounted on filler neck 12 by spring fingers 28, it may not be removed from the filler neck so long as cap 14 is locked on the adapter, and thus, the entire gas cap assembly 10 cannot be removed from the filler neck by unauthorized persons. When cap 14 is removed from adapter 16, slots 40 in tubular portion 18 thereof provide access to fingers 28 of spring clips 26 for disengaging the fingers from flared portion 32 of filler neck 12 so that the adapter may be removed therefrom.

Figure 4:
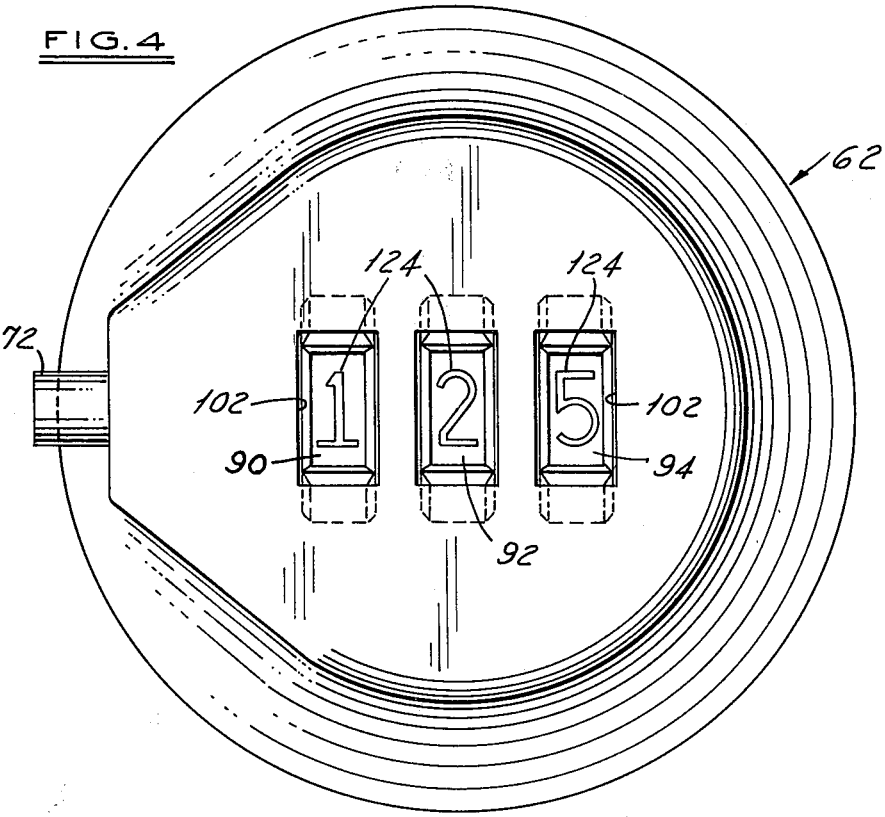
FIG. 4 is a top view of the locking cap assembly of FIG. 1.

To remove cap 14 from adapter 16, dial wheels 90 through 94 are rotated to unlock actuator shaft 72 which is then manually manipulated to disengage latches 78 and 80 from adapter 16, thereby permitting the cap to be removed therefrom. Actuator shaft 72 is unlocked by rotating dials 90 through 94 so that a predetermined combination of numerals 124 (such as the combination 1-2-5 shown in FIG. 4) appears in slots 102 in cover 62 of the cap, which combination of numerals has been selected to align the passageways 106 of each dial wheel with its associated keys 96 through 100 on actuator shaft 72. With shaft 72 unlocked, pressure is manually applied to the exposed end thereof to shift the actuator shaft to the right (as shown in FIG. 1) to disengage latches 78 and 80 from rib 24 of adapter 16. This movement of actuator shaft 72 simultaneously shifts latch 78 to the right and pivots latch 80 clockwise against the bias of spring 87 to release the latches from rib 24, thereby permitting the cap to be removed from the adapter. When the manual pressure on the exposed end of actuator shaft 72 is released, spring 87 shifts the actuator shaft to the left and returns both the actuator shaft and the latches to the position shown in FIG. 1.

So long as shaft 72 is unlocked by the dial wheels, cap 14 may be mounted on adapter 16 by merely manually reinserting the cap therein, which causes cam surfaces 88 and 89 on the outboard edges of latches 78 and 80 to bear on rib 24 and both shift latch 78 to the right and rotate latch 80 clockwise so that the latches will pass over rib 24 and snap into underlying engagement therewith to secure cap 14 on adapter 16. Alternatively, plunger 72 may be manually shifted to the right to allow latches 78 and 80 to clear rib 24 as cap 14 is inserted into the adapter and then released so that the latches will snap into underlying engagement with the rib to secure cap 14 on adapter 16. After plunger 72 has been returned by spring 87 to the position shown in FIG. 1, dial wheels 90 through 94 are rotated at random so that the passages 106 of at least one and preferably all of the dial wheels are not aligned with their associated keys 96 through 100, thereby preventing actuator shaft 72 from being depressed and, hence, locking cap 14 on adapter 16.

The adapter provides a locking filler cap assembly embodying this invention which may be used with filler necks having open ends with a predetermined range of sizes or diameters. The use of spring fingers to retain the adapter on the filler neck provides an adapter which may be readily installed on the filler neck by unskilled persons without using any tools and provides a locking cap assembly which is extremely difficult for unauthorized persons to remove. The single actuator rod arrangement for both latching and locking the cap to the adapter provides a locking filler cap assembly which may be readily and easily manipulated and is of comparatively economical manufacture and assembly and rugged and durable construction, which has a long in-service life, and is virtually service free.

We claim:

1. A locking cap assembly for a filler neck comprising an adapter mountable on a predetermined range of sizes of open ends of filler necks in communication with the interior thereof, a cap removably receivable on said adapter for sealing the open end of the filler neck to prevent a liquid from escaping therethrough to the exterior thereof, and a lock carried by said cap for releasably retaining said cap on said adapter in sealing relation with the open end of the filler neck, whereby the same locking cap assembly may be utilized for sealing a range of sizes of open ends of filler necks.

2. The locking cap assembly of claim 1 which also comprises a circumferentially continuous seal of a resilient material carried by said adapter, said seal having a sufficient generally radial width to prevent fluid from escaping between said adapter and the predetermined range of sizes of open ends of filler necks on which said adapter is mounted, said seal having at least one circumferentially and axially extending groove therein opening into a generally radially extending face of said seal.

3. The locking cap assembly of claim 1 which also comprises a retainer carried by said adapter and releasably retaining said adapter on the filler neck, said retainer being releasable to permit removal of said adapter from the filler neck only when said cap is removed from said adapter.

4. The locking cap assembly of claim 3 which also comprises a circumferentially continuous seal of a resilient material carried by said adapter, said seal having a sufficient generally radial width to prevent fluid from escaping between said adapter and the predetermined range of sizes of open ends of filler necks on which said adapter is mountable.

5. The locking cap assembly of claim 3 wherein said retainer comprises at least two fingers carried by said adapter and yieldably biased such that the free end of each finger underlies an inturned edge of the open end of the filler neck on which said adapter is received to releasably retain said adapter thereon.

6. The locking cap assembly of claim 5 which also comprises a circumferentially continuous seal of a resilient material carried by said adapter, said seal having a sufficient generally radial width to prevent fluid from escaping between said adapter and the predetermined range of sizes of open ends of filler necks on which said adapter is mountable, said seal being compressible generally axially between said adapter and the open end of the filler neck to permit said free ends of said fingers to be positioned to underlie the inturned edge of the open end of the filler neck on which said adapter is received.

7. The locking cap assembly of claim 5 wherein said adapter comprises a tubular portion received within the filler neck when said adapter is mounted thereon, said free ends of said fingers being carried exteriorly of said tubular portion and being received within the filler neck when said adapter is mounted thereon, and openings through said tubular portion providing access to said fingers adjacent the free ends thereof through the interior of said adapter only when said cap is removed therefrom, whereby said adapter may be released from the filler neck only when said cap is removed from said adapter.

8. The locking cap assembly of claim 7 which also comprises a circumferentially continuous seal of a resilient material carried by said adapter, said seal having a sufficient generally radial width to prevent fluid from escaping between said adapter and the predetermined range of sizes of open ends of filler necks on which said adapter is mountable, said seal being compressible generally axially between said adapter and the open end of the filler neck to permit said free ends of said fingers to be positioned to underlie the inturned edge of the open end of the filler neck on which said adapter is received.

9. The locking cap assembly of claim 1 wherein said lock comprises an actuator shaft carried by said cap for axial reciprocation relative to said cap to latched and unlatched positions of said actuator shaft, at least one end of said actuator shaft projecting exteriorly of said cap for manually moving said actuator shaft axially in at least one direction relative to said cap, and at least first and second spaced apart latches operably connected with said actuator shaft for engaging said adapter to prevent removal of said cap therefrom when said actuator shaft is in said latched position and disengaging from said adapter to release said cap for removal from said adapter when said actuator shaft is in said unlatched position.

10. The locking cap assembly of claim 9 wherein said lock also comprises a plurality of dial wheels journalled on said actuator shaft for rotation relative thereto at least when said actuator shaft is in said latched position, at least a portion of each of said dial wheels projecting exteriorly of said cap to permit said dial wheels to be manually rotated, and each of said dial wheels being operably associated with said actuator shaft such that said shaft can be moved axially from said latched to said unlatched position thereof only when each of said dial wheels is in a predetermined angular position.

11. The locking cap assembly of claim 9 wherein said first latch is fixedly carried by said actuator shaft for reciprocal movement therewith and said second latch is pivotally carried by said cap.

12. The locking cap assembly of claim 11 wherein said lock also comprises a spring bearing on said second latch and yieldably biasing both of said latches and said actuator shaft to the latched positions thereof, and said actuator shaft has only one end projecting exteriorly of said cap with the other end thereof adapted to bear on said second latch to pivot said second latch to disengage from said adapter when said actuator shaft is moved axially from said latched to said unlatched position thereof.

13. The locking cap assembly of claim 11 wherein said lock also comprises a plurality of dial wheels journalled on said actuator shaft for rotation relative thereto at least when said actuator shaft is in said latched position, at least a portion of each of said dial wheels projecting exteriorly of said cap to permit said dial wheels to be manually rotated, and each of said dial wheels being operably associated with said actuator shaft such that said shaft can be moved axially from said latched to said unlatched position thereof only when each of said dial wheels is in a predetermined angular position.

14. A locking cap assembly for a filler neck having a flange projecting inwardly adjacent an open end thereof, said cap assembly comprising an adapter mountable on a predetermined range of sizes of the open ends of filler necks in communication with the interior thereof, at least two fingers carried by said adapter and each being yieldably biased into engagement with an inwardly projecting flange of the filler neck to retain said adapter on the filler neck, a cap removably receivable on said adapter for sealing the open end of the filler neck to prevent a liquid from escaping therethrough to the exterior thereof, and a lock for releasably retaining said cap on said adapter in sealing relation with the open end of the filler neck, whereby the same locking cap assembly may be utilized for sealing a range of sizes of open ends of filler necks.

15. The locking cap assembly of claim 14 wherein said adapter has a generally tubular portion received within the filler neck when said adapter is mounted thereon and said fingers comprise spring fingers carried by said tubular portion and extending exteriorly thereof and interiorly of the filler neck to underlie the flange thereof.

16. The locking cap assembly of claim 15 wherein said tubular portion has openings therethrough providing access to said spring fingers from the interior thereof such that said spring fingers cannot be disengaged from the flange of the filler neck to release said adapter therefrom without removing said cap from said adapter.

17. The locking cap assembly of claim 1 wherein said adapter has a passage therethrough communicating with the interior of the filler neck on which said adapter is mounted, said cap when received on said adapter for sealing the open end of the filler neck prevents the liquid from escaping through said passage to the exterior of said adapter, and said lock retains said cap on said adapter in sealing relation with the open end of said passage through said adapter, and which also comprises a retainer carried by said adapter for releasably retaining said adapter on said filler neck with said passage in communication with the interior of said filler neck, said retainer being accessible for releasing said adapter from said filler neck only when said cap is removed from said filler neck, and a seal preventing the liquid from escaping between said adapter and said filler neck to the exterior thereof when said adapter is retained on said filler neck by said retainer.

* * * * *